United States Patent
Lu et al.

(10) Patent No.: US 7,193,387 B1
(45) Date of Patent: Mar. 20, 2007

(54) SYSTEM AND METHOD FOR MOTOR SPEED ESTIMATION USING HYBRID MODEL REFERENCE ADAPTIVE SYSTEM

(75) Inventors: Haihui Lu, Shanghai (CN); Wei Qian, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/375,800

(22) Filed: Mar. 14, 2006

(51) Int. Cl.
*H02P 1/26* (2006.01)

(52) U.S. Cl. ............... 318/800; 318/431; 388/906; 388/917

(58) Field of Classification Search ........ 318/430–434, 318/727, 798–802; 388/904, 906, 907.2, 388/907.5, 917
See application file for complete search history.

(56) References Cited

U.S. PATENT DOCUMENTS

| | | | | |
|---|---|---|---|---|
| 3,889,167 A | * | 6/1975 | Tanaka et al. | 318/809 |
| 4,295,084 A | * | 10/1981 | Nagase et al. | 318/719 |
| 4,760,321 A | * | 7/1988 | Tanaka et al. | 318/809 |
| 4,777,581 A | * | 10/1988 | Smith | 363/161 |
| 5,548,197 A | | 8/1996 | Unsworth et al. | |
| 5,859,514 A | | 1/1999 | Chouffier et al. | |
| 6,281,659 B1 | * | 8/2001 | Giuseppe | 318/799 |
| 6,414,463 B1 | | 7/2002 | Griepentrog et al. | |
| 6,577,096 B2 | * | 6/2003 | Cho | 318/727 |
| 2006/0192520 A1 | | 8/2006 | Yin et al. | |
| 2006/0192522 A1 | | 8/2006 | Kerkman et al. | |

* cited by examiner

*Primary Examiner*—Bentsu Ro
(74) *Attorney, Agent, or Firm*—Steven M. Haas; Alexander M. Gerasimow

(57) ABSTRACT

Motor drives, motor speed controllers, motor speed estimation systems, and methods are presented for controlling motor startup speed and for estimating motor speed during startup, in which a speed estimate controller provides a rotor speed estimate based on a first error term from a torque-based MRAS component for a first range of motor speeds and based on a second error term from a rotor flux-based MRAS component for a second range of speeds.

20 Claims, 5 Drawing Sheets

SYSTEM AND METHOD FOR MOTOR SPEED ESTIMATION USING HYBRID MODEL REFERENCE ADAPTIVE SYSTEM

FIELD OF THE INVENTION

The present invention relates generally to electric induction motors and more particularly to estimating motor speed using hybrid model reference adaptive systems.

BACKGROUND OF THE INVENTION

Motor control systems are widely used to control various aspects of motor performance in a broad spectrum of applications in which electric motors drive loads. Induction motors are asynchronous AC motors having a stator with stator windings providing a rotating AC stator field, with a rotor attached to the motor shaft to rotate within the stator field. Induction motors generally include a so-called squirrel cage rotor with the rotor rotating at a speed less than the rotational speed of the rotating stator field. The rotation of the stator magnetic field induces a current in the rotor conductors, in turn creating a rotor magnetic field that causes the rotor to turn in the direction the stator field is rotating. For many electric motor applications, control of the motor speed is important, particularly where the shaft load varies. In this regard, speed control during startup is particularly important in many motor control applications.

To regulate the motor performance according to a desired speed, it is necessary to measure or estimate the actual rotational speed of the rotor at any given time. In certain induction motor control architectures, moreover, soft-starters are used to energize the stator windings during startup, with the soft startup controls being bypassed once the motor reaches the normal operating speed, in order to minimize steady state heat generation. Many conventional motor control systems employ some form of tachometer or other sensor device mechanically coupled to the motor shaft to produce a feedback signal representing the motor speed, to facilitate closed loop startup speed control. However, such external sensors add cost to the motor drive system, and require maintenance.

Sensorless systems have been proposed and introduced, often employing model-based estimation or speed estimation based on measuring stator current harmonic content. However, actual motor startup times using these systems often varies with line voltage and motor load, which makes it difficult to coordinate motor startup with other equipment in various automated systems. Model-based approaches in particular suffer from variance in motor parameters and weak signals during motor startup. Stator-current-harmonics-based approaches require complex signal processing and the measured harmonics are related to the rotor structure, whereby the speed estimate cannot be updated quickly. Thus, there is a continuing need for improved motor controls and sensorless speed estimation techniques and systems for motor control applications, particularly for controlling motor speeds during startup.

SUMMARY OF INVENTION

One or more aspects of the invention are now summarized to facilitate a basic understanding of the invention, wherein this summary is not an extensive overview of the invention, and is intended neither to identify certain elements of the invention, nor to delineate the scope thereof. The primary purpose of the summary, rather, is to present some concepts of the invention in a simplified form prior to the more detailed description that is presented hereinafter. The present invention involves hybrid Model Reference Adaptive System (MRAS)-based speed estimation and motor control techniques that are particularly useful in controlling AC induction motor speed during startup without the need for tachometers or other speed sensors. The invention employs a torque-based MRAS error term over a first speed range, such as from zero to about 80% of full speed, and then a rotor-flux-based MRAS error term for a second speed range, wherein the hybrid MRAS components and closed loop controller are used in providing an estimated speed that is compared with a threshold to determine when the speed estimation switches from torque to flux-based MRAS. In certain embodiments, one of the MRAS error terms is provided to a regulating speed estimate controller, such as a proportional-integral (PI) controller, where the speed estimate controller generates the speed estimate with at least one speed estimate controller gain factor (e.g., $K_I$ and/or $K_P$) being adjusted inversely with respect to the stator or rotor flux modulus, wherein the hybrid MRAS technique is less sensitive to motor parameter inaccuracy or variations compared with previous sensorless motor startup approaches, while retaining the cost and maintenance advantages of sensorless control.

In accordance with one or more aspects of the invention, a motor drive system is provided for operating an induction motor. The drive system includes a switching system for selectively coupling the motor leads to an AC power source, as well as a motor startup control system for controlling and estimating the motor speed during startup. The motor startup control system includes a hybrid MRAS component, a motor controller with an output driving a switch control circuit and speed estimate controller providing a rotor speed estimate, with an error selector to provide a speed estimate controller error input from a torque-based MRAS component when the rotor speed estimate is less than or equal to a first threshold or from a rotor flux-based MRAS component when the estimated speed is above the threshold. The torque-based MRAS component provides a first error term representing a difference between a calculated torque value and an estimated torque value, while the flux-based MRAS component provides a second error term based on a difference between a calculated rotor flux and an estimated rotor flux, which can be computed as a vector product. The speed estimate controller provides the speed estimate during startup according to the selected controller error input, with one or more speed estimate controller gain factors being adapted or adjusted based on the stator or rotor flux modulus.

In one embodiment, the control system evaluates stator equations to derive a calculated rotor flux according to current and voltage feedback values, and evaluates rotor equations to derive an estimated rotor flux according to current feedback values and according to the most recent rotor speed estimate. The torque-based MRAS component computes a calculated torque value according to the calculated rotor flux and computes an estimated torque value according to the estimated rotor flux, and then provides the first error term as the difference between the calculated and estimated torque values. In this example, the rotor flux-based MRAS component provides the second error term as a vector product of the calculated rotor flux and the estimated rotor flux from the stator and rotor equations. The motor drive system may also include bypass switches to selectively to connect the motor leads to the AC power source bypassing the switching system, with a bypass controller to activate the bypass switches when the rotor speed exceeds a second threshold value.

Further aspects of the invention provide a system for controlling the speed of an electric motor during startup. The system is comprised of a speed estimate controller providing a rotor speed estimate according to a controller error input and a motor controller providing a controller output for controlling the motor speed during startup according to a desired startup speed profile and according to the estimated motor speed. The system further includes a hybrid model reference adaptive system (MRAS) component, with a torque-based MRAS component providing a first error term representing a difference between a calculated torque value and an estimated torque value, and a rotor flux-based MRAS component providing a second error term representing a difference between a calculated rotor flux and an estimated rotor flux. An error selector is operatively coupled with the hybrid MRAS component and with the speed estimate controller to provide the error input to the speed estimate controller, where the first error term is provided as the controller error input when the rotor speed estimate is less than or equal to a first threshold and the second error term is provided as the controller error input when the rotor speed estimate is greater than the first threshold.

Other aspects of the invention relate to a hybrid model reference adaptive system (MRAS) motor speed estimation system for estimating the speed of an electric motor. The hybrid MRAS system includes a speed estimate regulator or controller, torque and flux based MRAS components, and an error selector, where the speed estimate controller provides a rotor speed estimate according to a controller error input, and the controller includes one or more gain factors that are adjusted at least partially based on a stator or rotor flux modulus. The torque-based MRAS component provides a first error term representing a difference between a calculated torque value and an estimated torque value, and the rotor flux-based MRAS component provides a second error term representing a difference between a calculated rotor flux and an estimated rotor flux. The error selector provides the error input to the speed estimate controller according to the first error term when the rotor speed estimate is in a first speed range and provides the error input according to the second error term when the rotor speed estimate is in a second speed range.

Further aspects of the invention relate to a method for controlling the speed of an electric motor. The method includes providing a rotor speed estimate according to a controller error input, computing a first error term as the difference between a calculated torque value and an estimated torque value, computing a second error term as a vector product of a calculated rotor flux and an estimated rotor flux, and providing the error input to the controller according to the first error term when the rotor speed estimate is in a first speed range and providing the error input according to the second error term when the rotor speed estimate is in a second speed range. In certain embodiments, the method also includes adjusting at least one gain factor of the controller at least in part according to a stator or rotor flux modulus.

BRIEF DESCRIPTION OF THE DRAWINGS

The following description and drawings set forth certain illustrative implementations of the invention in detail, which are indicative of several exemplary ways in which the principles of the invention may be carried out. The illustrated examples, however, are not exhaustive of the many possible embodiments of the invention. Other objects, advantages and novel features of the invention will be set forth in the following detailed description of the invention when considered in conjunction with the drawings, in which.

DETAILED DESCRIPTION OF THE INVENTION

Figure 1:
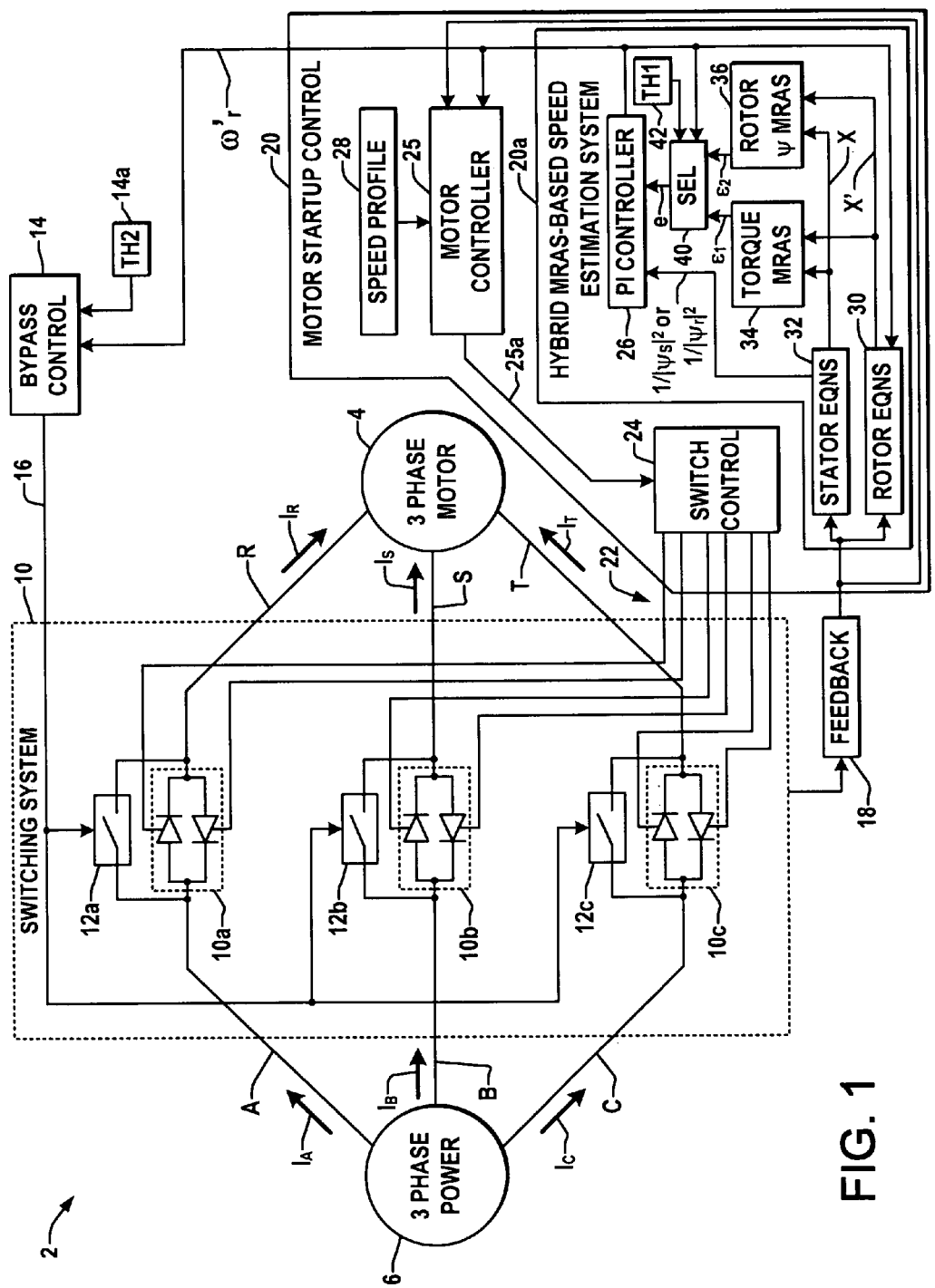
FIG. 1 is a detailed schematic diagram illustrating an exemplary motor drive system for driving an induction motor, including a hybrid MRAS-based startup control system for controlling and estimating motor speed during startup and a bypass system for operating the motor at full speed.

Referring now to the figures, several embodiments or implementations of the present invention are hereinafter described in conjunction with the drawings, wherein like reference numerals are used to refer to like elements throughout, the invention is hereinafter illustrated and described in the context of startup control for a three-phase induction motor, although the invention is not limited to the illustrated examples and can be employed in controlling AC motors of any number of phases. The embodiments illustrated below employ closed-loop control of motor speed during startup, in which an error value used by a regulating controller is obtained using a torque-based MRAS component for a first range of speeds, and then the error is obtained for a second speed rage using a rotor flux-based MRAS component, thereby providing hybrid MRAS speed estimation and control. The inventors have found that the hybrid MRAS approach can be easily implemented in existing motor control apparatus, including soft starters and other motor control devices, and may facilitate uniform speed tracking performance throughout a motor startup process wherein certain motor control drives can be upgraded to implement various features of the invention by software updates in order to implement the hybrid MRAS concepts illustrated and described herein. For instance, where the stator resistance is known or can be measured, the hybrid MRAS systems can be implemented to yield good speed estimation and control performance to facilitate linear ramp control or any other form of desired speed control profile desired by a user.

Figure 5A:
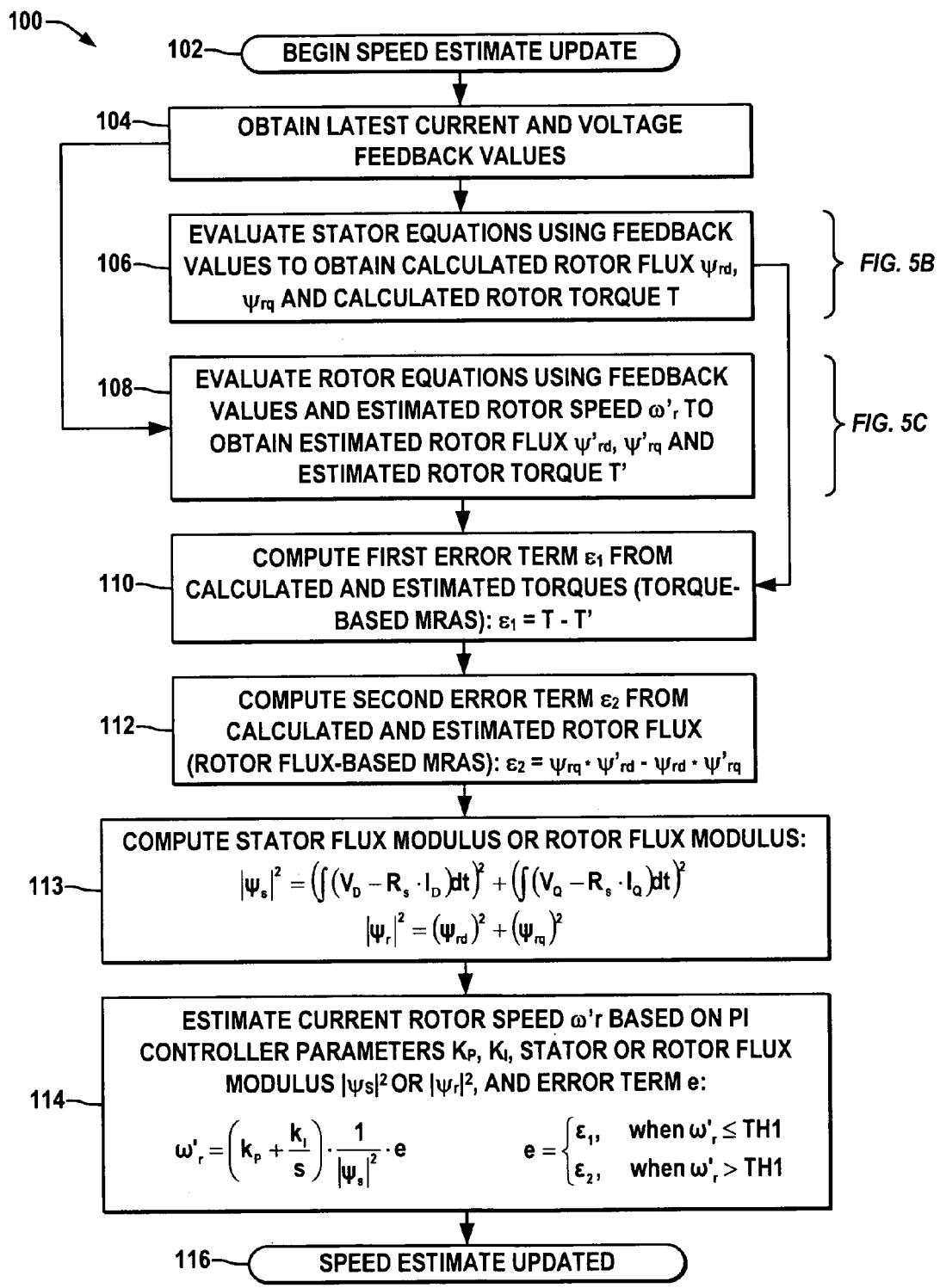
FIGS. 5A–5C are detailed flow diagrams illustrating exemplary speed estimate update operation using a hybrid torque and rotor flux-based MRAS system.
Figure 5B:
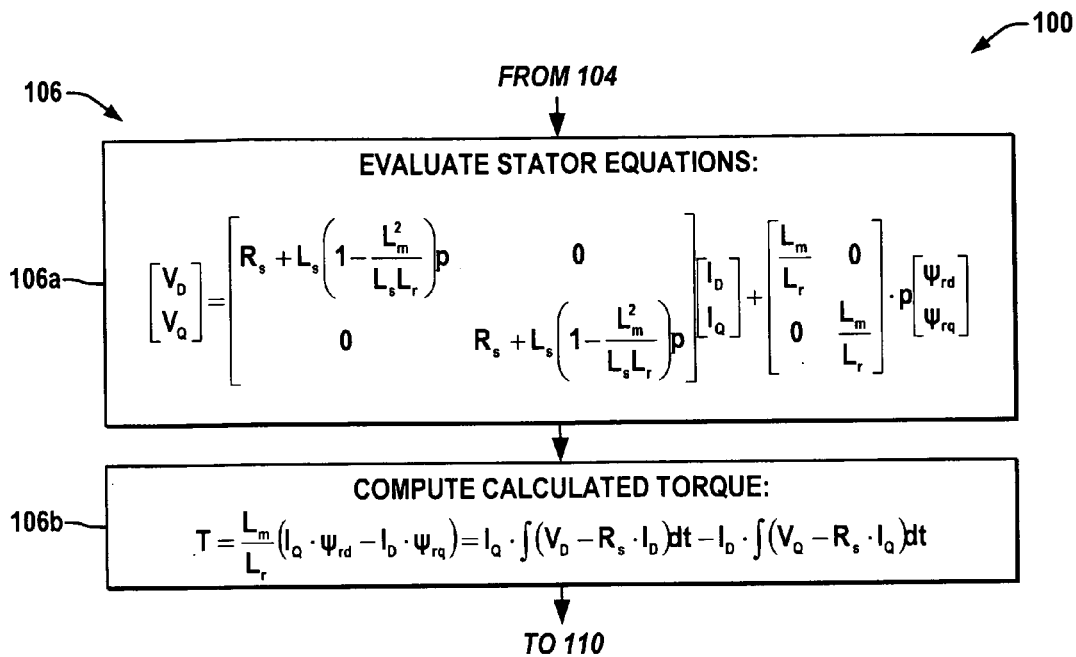
Figure 5C:
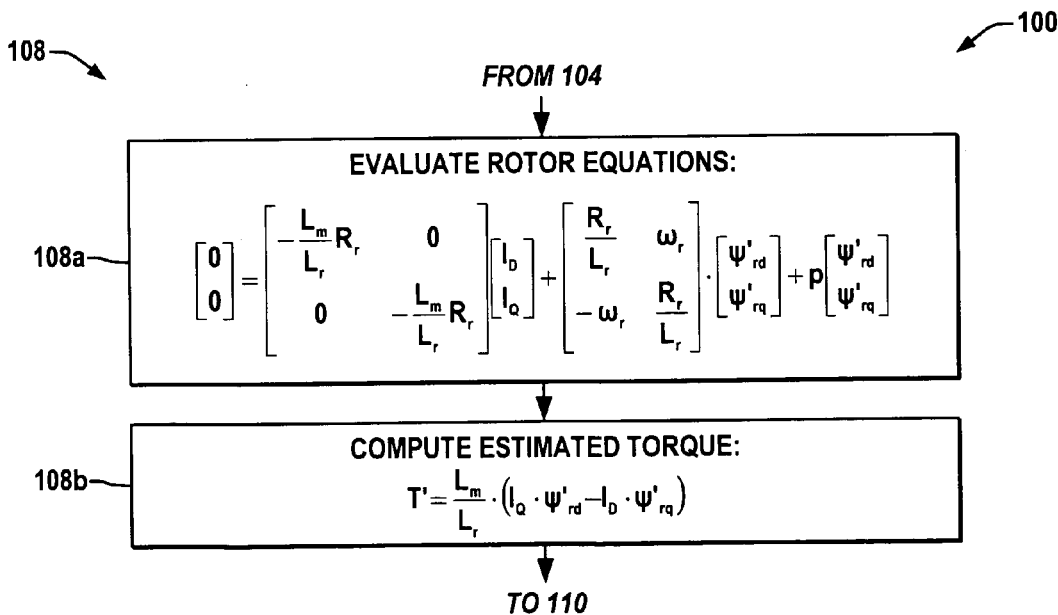

While not wishing to be tied to any particular theory, the inventors take advantage of the fact that the flux linkages of a motor can be calculated from a set of stator equations and a set of rotor equations, as shown in FIGS. 5B and 5C below, wherein the stator equations do not involve motor speed and can thus be regarded as a reference model. The rotor equations, however, include speed and are thus used as an adjustable model, where the motor speed (e.g., rotor speed)

is a parameter in the adjustable model. Moreover, the inventors have appreciated that the estimated torque changes proportionally with the speed estimation error throughout a significant major portion of the startup process, i.e., over a first speed range, wherein a torque-based MRAS component can be successfully used to provide a closed loop control/estimation error term in this first range of speeds. However, the inventors have further found that this relationship does not hold for higher speeds (e.g., in a second speed range), wherein the speed estimation error has almost no impact on rotor flux estimation until the motor speed is in this second (higher) range. The invention uses these discoveries in providing control based on the torque MRAS for low speeds and then using flux-based MRAS components to generate the error term in a second higher speed range, which can be used in motor startup control for implementing any desired speed control profile or operating mode, including but not limited to current limiting mode, soft start mode, current limit with kick start mode, soft start with kick start mode, etc., for both no load and loaded operation. The exemplary hybrid MRAS techniques illustrated and described below employ a threshold speed value defining the boundary between the first and second speed ranges, where any suitable threshold value may be used. In one example, the threshold may be set at about 80% of the motor's full speed, with torque-based MRAS being used for 0 to about 80% of rated speed, and rotor-flux-based MRAS being employed for the second 80%~100% speed range, where the estimated speed is used for switching between the two control ranges.

In these examples, moreover, the adaptive regulator or controller gain is auto-adjusted to be inversely proportional to the square of the stator or rotor flux modulus. In the illustrated examples below, leakage inductance is removed from the reference model in the torque-based stage, where the calculated torque is essentially accurate since stator resistance $R_S$ is the only motor parameter in the reference model, and Rs has been found to be fairly constant during the startup process. The stator equations yield the stator flux term $\psi_S$ and the proportional and integral gains $K_P$ and $K_I$ of a $P_I$ type controller are adjusted based on the reciprocal of the square of the stator flux $1/|\psi_S|^2$ (or based on the reciprocal of the square of the rotor flux $1/|\psi_r|^2$) such that the adjustment of the controller gains is essentially free of motor parameter variations since its calculation involves only stator resistance Rs, which can be considered constant during startup, where $R_S$ can be measured or estimated using any suitable techniques in constructing the stator equations. In the rotor-flux-based control range, the motor is approaching full speed, wherein the remaining motor parameters approach normal values, by which the speed estimation provides an accurate speed value until well after the motor transitions into steady-state operation.

Figures 2, 3:
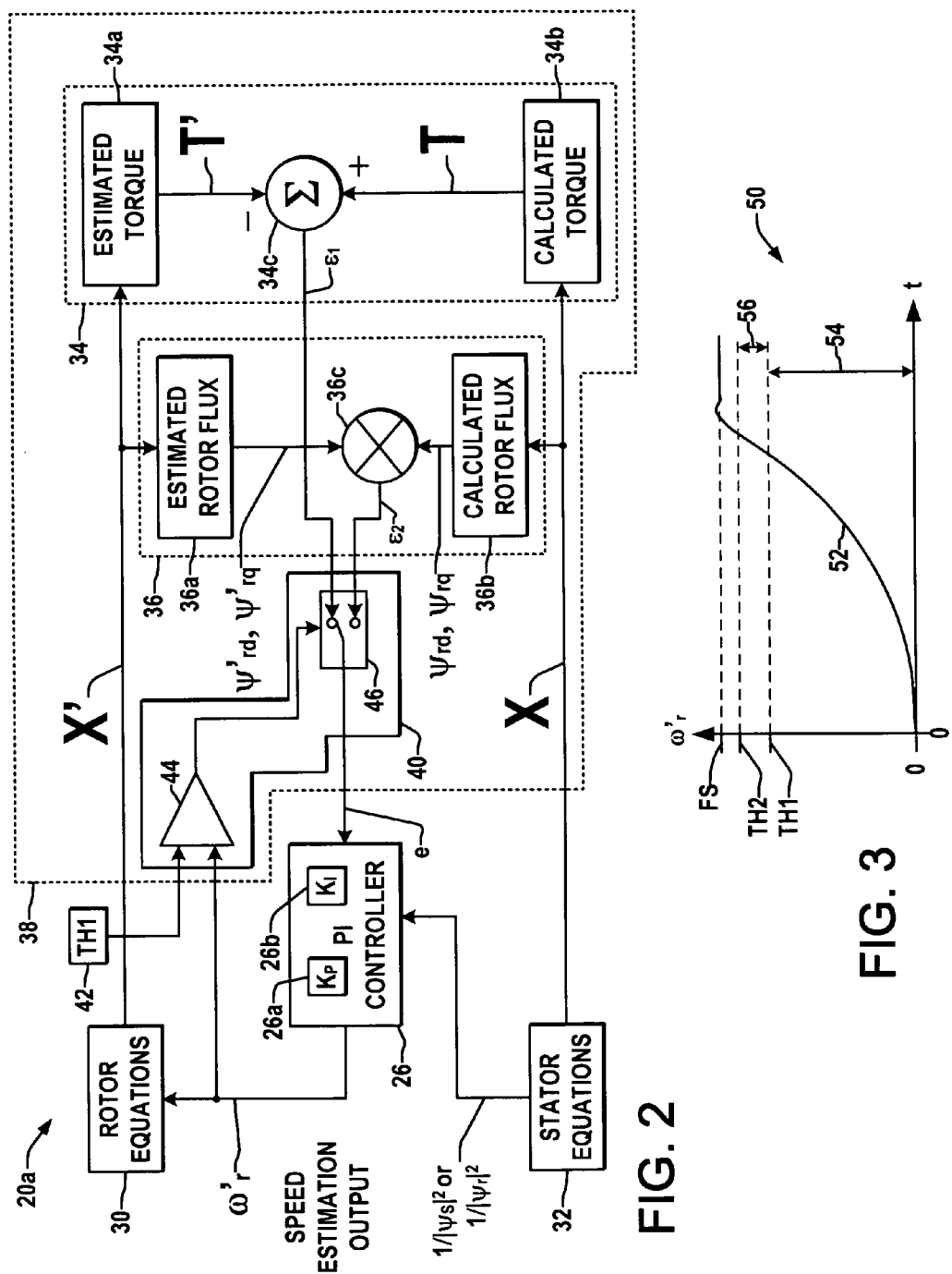
FIG. 2 is a schematic diagram illustrating further details of the speed estimation system of the MRAS-based startup control system of FIG. 1.
FIG. 3 is a graph of motor speed vs. time during startup, showing control of the motor speed in first and second ranges in the system of FIGS. 1 and 2 according to a threshold.

FIGS. 1 and 2 show an exemplary motor drive system 2 for driving a polyphase induction motor 4 using power from a three phase AC power source 6. The system 2 includes a switching system 10 with three pairs of SCR switching devices 10a, 10b, 10c coupled between power supply lines A, B, and C of the AC power source 6 and leads R, S, and T of the motor 4, respectively, with the individual switching devices operating to selectively couple a corresponding motor lead to the AC power source according to a corresponding switch control signal 22. In this manner portions of the power supply voltages can be applied to the motor windings to generate/create motor phase currents $I_R$, $I_S$, and $I_T$ Each phase coupling also includes a bypass switch 12a, 12b, and 12c, respectively, to selectively bypass the switching system 10 and the switch pairs 10a, 10b, and 10c thereof by connecting the motor leads R, S, and T to the AC power source lines A, B, and C according to a bypass control signal 16 from a bypass control component 14. The switching system 10 is operated by a hybrid MRAS-based startup control system 20 for controlling motor speed during startup, which includes a hybrid MRAS-based speed estimation system 20a for providing a speed estimate ω'r using torque and rotor flux-based MRAS components 34 and 36. While illustrated with SCR type switches 10a–10c, any type of electrical switching devices may be used in the system 10 and for the bypass switches 12.

The startup control system 2 and the speed estimation system 20a thereof can be implemented as any suitable hardware, software, and/or combinations thereof, where the control system 20 includes a switch control circuit 24 with circuitry for providing a plurality of switch control signals 22 to control operation of the switching devices 10a, 10b, and 10c of the switching system 10 during startup of the motor 4 according a control output signal 25a from a motor controller 25, which can be any suitable controller or regulator 25 by which the motor is controlled according to drive process feedback 18 and an estimated motor speed signal ω'r from the speed estimation system 20a. In addition, the motor controller 25 can be operated in a number of different modes or control schemes, including controlling torque, speed, etc., wherein the exemplary motor controller 25 operates to control the speed of the induction motor 4 during startup according to a user defined startup speed profile 28. The switch control circuit 24 provides appropriate switching signals 22 to operate the motor 4 in accordance with the motor control output 25a, which may include pulse width modulation or other switch timing control.

The hybrid MRAS speed estimation system 20a includes a PI controller 26 providing the speed estimate ω'r in radians per second, revolutions per minute, or other suitable units, which is indicative of the speed of the motor 4 at any given time. In this regard, the speed estimation may be performed at a rather high sampling rate such as every 100 us in one example, whereas the speed control of motor controller 25 may in certain embodiments be carried out at a slower rate, such as every 50 ms. The PI controller 26 in the speed estimation system 20a provides the speed estimate ω'r during startup and thereafter according to a controller error input e. The speed estimation system 20a also includes a hybrid model reference adaptive system (MRAS) component 38 with a torque-based MRAS component 34 providing a first error term $\epsilon_1$ representing the difference or error between a calculated torque value 34b (torque T in FIG. 2), and an estimated torque value 34a (T' in FIG. 2). The hybrid MRAS component 38 also includes a rotor flux-based MRAS component 36 providing a second error term $\epsilon_2$ representing the difference or error between a calculated rotor flux 36b ($\psi_{rd}$, $\psi_{rq}$ in FIG. 2) and an estimated rotor flux 36a ($\psi'_{rd}$, $\psi'_{rq}$ in FIG. 2), which may be computed as a vector product with the calculated and estimated polyphase flux terms $\psi_{rd}$, $\psi_{rq}$ and $\psi'_{rd}$, $\psi'_{rq}$ being represented in the arbitrary dual axis reference frame (d-q frame). These two MRAS components 34 and 36 provide the respective error terms 1 and $\epsilon_2$ to an error selector 40 providing a comparison function 44 and a switching function 46 (FIG. 2) to provide the error input e to the speed estimate Pi controller 26 as the first error term $\epsilon_1$ when the rotor speed estimate ω'r is less than or equal to a first threshold TH1 42 (a first speed range) or as the second error term $\epsilon_2$ when the rotor speed estimate is greater than the threshold 42 (a second speed range). Any threshold TH1 42 can be used, for example, about 80% of the rated full speed of the motor 4 in one embodiment.

The speed estimate controller 26 operates in generally continuous fashion to provide the motor speed estimate ω'r, with the switching system 10 providing feedback current and voltage values 18 from the motor drive process to the control system 20, such as phase or line voltages, stator current values, etc. The speed estimation system 20*a* includes stator equations 32 and rotor equations 30, as well as known or estimated values (e.g., resistances, inductances, number of poles P, etc.) for computing calculated and estimated flux and torque values using the current and voltage feedback 18 as inputs, where the calculated and estimated flux values ψ may also be represented in the d-q frame format. As shown in FIG. 1, the rotor speed estimate ω'r is provided by the PI speed estimate controller 26 to the rotor equations 30, and also to the motor controller 25 and the bypass control component 14, which selectively provides the bypass control signal 16 to bypass the switching system 10 when the rotor speed estimate ω'r is greater than a second threshold TH2 14*a*. As best shown in FIG. 2, moreover, the solutions X to the stator equations 30 (e.g., calculated rotor flux values $\psi_{rd}$, $\psi_{rq}$) are provided as inputs to the torque-based MRAS component 34 and to the rotor-flux based MRAS component 36. In addition, the reciprocal of the square of the stator flux modulus $1/|\psi_s|^2$ (e.g., or the reciprocal of the square of the rotor flux modulus $1/|\psi_r|^2$) is provided from the stator equations 32 to the speed estimate controller 26 for adjustment of the PI controller gains $K_I$ and $K_P$.

In operation, the speed estimation system 20*a* in the motor startup control system 20 evaluates the stator equations 32 to derive a calculated rotor flux 36*b* ($\psi_{rd}$, $\psi_{rq}$ in the d-q reference frame, as shown best in FIG. 2) according to the current and voltage feedback values 18, and evaluates the rotor equations 30 to derive an estimated rotor flux 36*a* ($\psi'_{rd}$, $\psi'_{rq}$) according to the feedback values 18 and according to the rotor speed estimate ω'r. The system 20*a* also computes either the stator flux modulus $|\psi_s|^2$ or the rotor flux modulus $|\psi_r|^2$. The torque-based MRAS component 34, in turn computes a calculated torque value T according to the calculated rotor flux 36*b* ($\psi_{rd}$, $\psi_{rq}$) and computes an estimated torque value T' according to the estimated rotor flux 36*a* ($\psi'_{rd}$, $\psi'_{rq}$). The torque-based MRAS component 34 then provides the first error term $\epsilon_1$ as the difference between the calculated and estimated torque values 36*b* and 36*a*, respectively ($\epsilon_1$=T–T'). The rotor flux-based MRAS component 36 provides the second error term $\epsilon_2$ as a vector product of the calculated rotor flux 36*b* ($\psi_{rd}$, $\psi_{rq}$) and the estimated rotor flux 36*a* ($\psi'_{rd}$, $\psi'_{rq}$).

Referring also to FIG. 3, a plot 52 is provided in a graph 50 showing motor speed ω'r vs. time t, wherein the system 2 provides for torque MRAS based speed estimation and speed control using the first error term $\epsilon_1$ in a first speed range 54 from zero to a first threshold speed value TH1 (threshold 42 in FIGS. 1 and 2). When the estimated speed ω'r exceeds the threshold TH1 in a second speed range 56, the speed estimate controller 26 uses the second error term $\epsilon_2$ (rotor flux-based MRAS control) until the speed ω'r exceeds the second (bypass) threshold TH2 (TH2 14*a* in FIG. 1), at which time the bypass control 14 provides the bypass control signal 16 to activate bypass switches 12*a*–12*c*, wherein the bypass threshold TH2 is typically above the first threshold TH1, and preferably near the full speed FS rating for the motor 4. The control system 20 can be employed for dual range control and/or speed estimation techniques using a hybrid MRAS approach to achieve a substantially uniform speed tracking performance throughout the startup speed range without the need for external tachometers or other sensors, and without suffering from noise associated with conventional harmonic measurement estimation techniques. Thus, the system 20 facilitates advanced sensorless control of startup speed profile in soft starters and other motor control applications.

Figure 4:
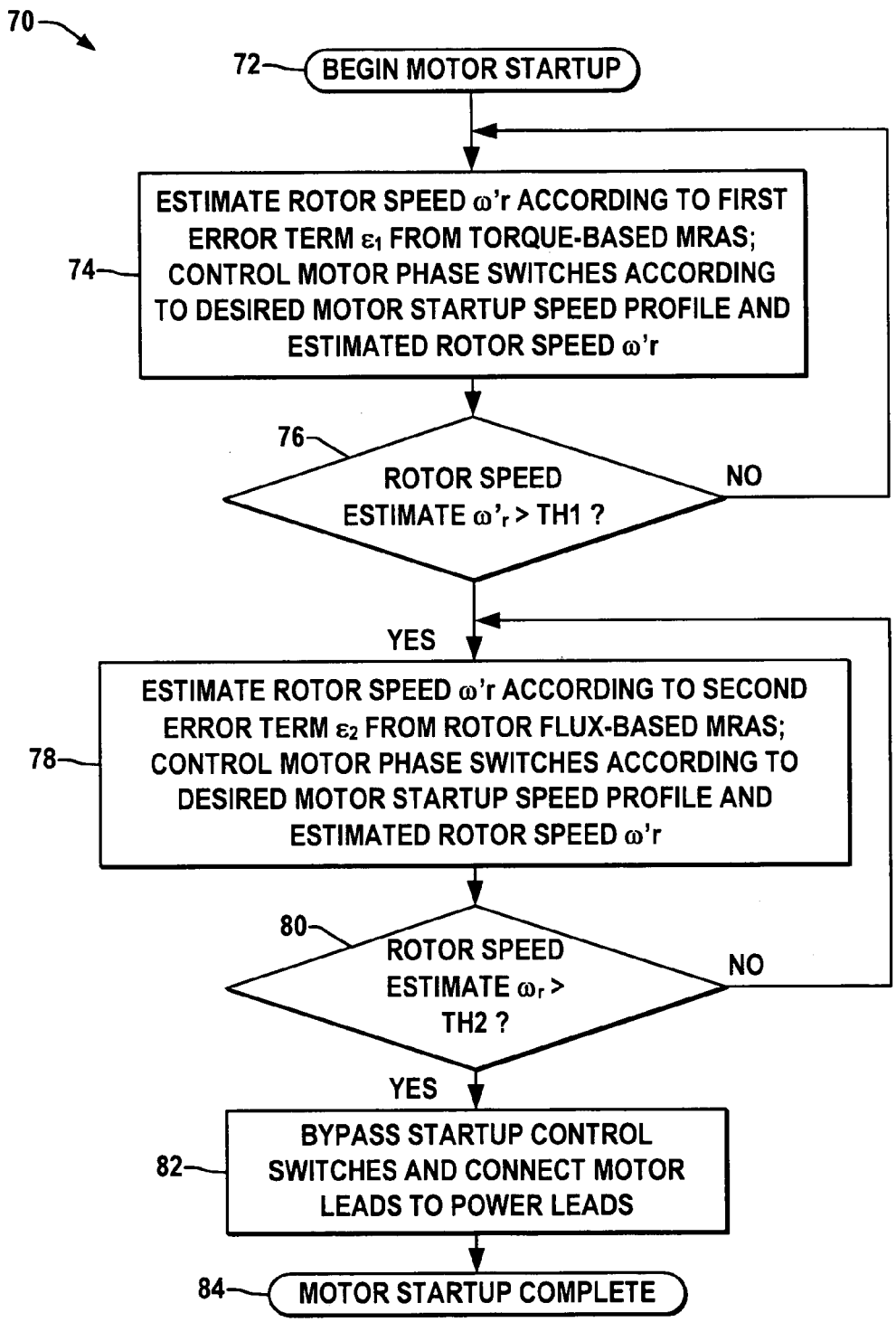
FIG. 4 is a flow diagram illustrating an exemplary method for motor startup control and speed estimation using a first error term from a torque-based MRAS system in a first speed range and using a second error term from a rotor-flux-based MRAS in a second speed range.

Referring now to FIGS. 4–5C, the motor control and speed estimation aspects of the hybrid MRAS approach are further illustrated in a flow diagram 70 in FIG. 4 showing an exemplary method for motor startup control and speed estimation using a first error term $\epsilon_1$ from a torque-based MRAS system (e.g., 34 above) in a first speed range (range 54 in FIG. 3) and using a second error term $\epsilon_2$ from a rotor-flux-based MRAS (36) in a second speed range (56). Although illustrated as a single flow, it will be appreciated that the speed estimation and motor control loops can be processed separately at different update rates, for instance, wherein the speed control loop will typically be processed at a lower rate than the speed estimation loop. Moreover, the hybrid MRAS-based speed estimation process can continue operating even after the startup process is complete (e.g., during bypass operation), in order to provide sensorless speed value feedback for steady state motor control or data acquisition. The process 70 begins at 72, in which the rotor speed is estimated using a first error term $\epsilon_1$ from a torque-based MRAS system (MRAS 34), and the motor phase switches (e.g., switches 10*a*, 10*b*, and 10*c* in FIG. 1) are controlled at 74 according to the desired motor startup speed profile (speed profile 28 in FIG. 1) and the speed estimate ω'r. A determination is made at 76 as to whether the estimated rotor speed ω'r is greater than the threshold TH1 (e.g., greater than about 80% of rated speed in one example). If not (NO at 76), the method 70 returns to 74 to continue motor control and torque-based MRAS speed estimation according to error term $\epsilon_1$. Once the speed ω'r exceeds TH1 (YES at 76), the second speed range (e.g., range 56 in FIG. 3) is entered, and the startup process continues to 78 in FIG. 4, where the rotor speed ω'r is estimated using a second error term $\epsilon_2$ from a rotor flux-based MRAS system (MRAS 36) and the motor switching is controlled according to the desired speed profile and the speed estimate ω'r. The speed estimate ω'r is compared to a second (e.g., bypass) threshold TH2 at 80 (e.g., bypass threshold 14*a* in FIG. 1), and if the speed is still in the second range (NO at 80), the method 70 returns to 78 to continue rotor flux-based MRAS speed estimation according to error term $\epsilon_2$ and corresponding motor speed control. When the speed estimate ω'r exceeds TH2 (YES at 80), the startup control switches are bypassed at 82 and the motor leads are connected to the power leads (e.g., bypassed) to complete the motor startup process 70 at 84.

FIGS. 5A–5C illustrate an example of the speed estimate update operation 100 using a hybrid torque and flux-based MRAS system 20*a*. The speed estimate update process 100 begins at 102, wherein the most recent current and voltage feedback values are obtained at 104 for use at 106 and 108 in evaluating or solving stator and rotor equations (e.g., equations 32 and 30 in the controller 20 of FIG. 1 above). At 106, the stator equations are evaluated using the feedback values to obtain calculated rotor flux and torque values $\psi_{rd}$, $\psi_{rq}$ 36*b* and T 34*b*, respectively. As best shown in FIG. 5B, the stator equations 32 are evaluated at 106*a* using the feedback values 18 for the motor terminal voltages $V_D$, $V_Q$ and stator currents $I_D$, $I_Q$ as well as the mutual inductance $L_m$, the rotor and stator inductances $L_r$ and $L_s$, and the stator resistance $R_s$, to obtain the calculated rotor flux value $\psi_{rd}$, $\psi_{rq}$, where the values for $L_m$, $L_r$, $L_s$, and $R_s$ can be measured values or may be estimated or otherwise specified based on the particular motor 4 being controlled. The torque-based MRAS component 34 then computes the calculated torque value T 34b at 106b based on the calculated rotor flux values $\psi_{rd}$, $\psi_{rd}$ 36b, the feedback values 18, and the stator resistance $R_S$. Referring back to FIG. 5A, the rotor equations 30 are evaluated at 108 using the current feedback values 18 and the most recent rotor speed estimate ω'r to obtain estimated rotor flux and torque values 36a and 34a ($\psi'_{rd}$, $\psi'_{rq}$, and T' in FIG. 1). As best shown in FIG. 5C, the rotor equations 30 employ the feedback values 18 ($I_D$, and $I_Q$) along with the speed estimate ω'r and the motor parameters $L_m$, $L_r$, and $R_r$ at 108a from which the flux values 36a $\psi'_{rd}$, $\psi'_{rq}$ can be computed. At 108b, the torque-based MRAS component 34 then computes the estimated torque value T' using the motor parameters $L_m$, $L_r$, and the estimated rotor flux values 36a $\psi'_{rd}$, $\psi'_{rq}$.

Referring again to FIG. 5A, once the calculated and estimated flux and torque values have been obtained from evaluation of the stator and rotor equations 32 and 30 at 106 and 108, respectively, the speed estimate update process 100 continues at 110, where the first error term $\epsilon_1$ is computed (e.g., by the torque-based MRAS component 34) from the calculated and estimated torque values T 34b and T' 34a, respectively, wherein $\epsilon_1$ is computed as T–T' in the illustrated embodiment. At 112, the second error term $\epsilon_2$ is computed (e.g., by the flux-based MRAS component 36) from the calculated and estimated rotor flux values $\psi_{rd}$, $\psi_{rq}$ 36b and $\psi'_{rd}$, $\psi'_{rq}$ 36a, respectively. In this example, the second error term $\epsilon_2$ is computed as a vector product $\psi_{rq}*\psi'_{rd}-\psi_{rd}*\psi'_{rq}$. At 113, a flux modulus is calculated for use by the estimation controller, which can be either the stator flux modulus $|\psi_S|$ or the rotor flux modulus $|\psi_r|$, The current speed is then estimated at 114 using one of the error terms $\epsilon_1$ and $\epsilon_2$, where the controller 26 (FIG. 1) generates a new estimate of the speed ω'r based on the controller gain parameters $K_P$ 26a and $K_I$ 26b (FIG. 1), the reciprocal of the square of either the stator flux modulus $1/|\psi_S|^2$ or the rotor flux modulus $1/|\psi_r|^2$, and the controller error input e (selected as either $\epsilon_1$ or $\epsilon_2$ based on the current speed estimate ω'r from the last update cycle), and the estimate update is completed at 116. In the illustrated example, the gain parameters $K_P$ 26a and $K_I$ 26b are modified according to the flux modulus by the modified PI control output equation ω'r=$(K_P+(K_I/S))*e/(|\psi_S|^2)$, where e=$\epsilon_1$ for ω'r less than or equal to TH1 and e=$\epsilon_2$ for ω'r greater than TH1. In this manner, the controller 26 provides the motor speed estimate ω'r using a dual range hybrid MRAS technique based on either torque or flux-based MRAS components with $K_I$ and $K_P$ being modified or adapted according to the reciprocal of the square of the flux modulus.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. An AC motor drive system for operating an AC induction motor, the motor drive system comprising:
   a switching system including a plurality of switching devices coupled between an AC power source and an induction motor, the individual switching devices operative to selectively couple a corresponding motor lead to the AC power source according to a corresponding switch control signal; and
   a motor startup control system for controlling the motor speed during startup, the motor startup control system comprising:
      a hybrid model reference adaptive system (MRAS) component including:
         a torque-based MRAS component providing a first error term representing a difference between a calculated torque value and an estimated torque value; and
         a rotor flux-based MRAS component providing a second error term representing a difference between a calculated rotor flux and an estimated rotor flux;
      a speed estimate controller providing a rotor speed estimate according to a controller error input;
      a motor controller providing a motor controller output for controlling the motor speed during startup according to a desired startup speed profile and according to the rotor speed estimate;
      a switch control circuit providing a plurality of switch control signals to control operation of the switching devices of the switching system during startup of the motor according to the controller output; and
      an error selector operatively coupled with the hybrid MRAS component and with the speed estimate controller to provide the error input to the speed estimate controller, the error selector providing the first error term as the controller error input when the rotor speed estimate is less than or equal to a first threshold and providing the second error term as the controller error input when the rotor speed estimate is greater than the first threshold.

2. The motor drive system of claim 1, further comprising bypass switches operative to selectively bypass the switching system by connecting the motor leads to the AC power source according to a bypass control signal; and a bypass control component receiving the rotor speed estimate from the speed estimate controller and providing the bypass control signal to bypass the switching system when the rotor speed estimate is greater than a second threshold.

3. The motor drive system of claim 1, wherein the first threshold is about 80% of the rated full speed of the motor.

4. The motor drive system of claim 1:
   wherein the motor startup control system evaluates stator equations to derive a calculated rotor flux according to current and voltage feedback values, and evaluates rotor equations to derive an estimated rotor flux according to current and voltage feedback values and according to the rotor speed estimate;

wherein the torque-based MRAS component computes a calculated torque value according to the calculated rotor flux, computes an estimated torque value according to the estimated rotor flux, and provides the first error term as the difference between the calculated and estimated torque values; and wherein the rotor flux-based MRAS component provides the second error term as a vector product of the calculated rotor flux and the estimated rotor flux.

5. The motor drive system of claim 4:

wherein the motor startup control system computes one of a stator flux modulus and a rotor flux modulus;

wherein the speed estimate controller is a proportional integral (PI) controller with proportional and integral gains $K_I$ and $K_P$, respectively;

and wherein the speed estimate controller adjusts $K_I$ and $K_P$ according to a reciprocal of the square of the stator or rotor flux modulus.

6. The motor drive system of claim 5, further comprising bypass switches operative to selectively bypass the switching system by connecting the motor leads to the AC power source according to a bypass control signal; and a bypass control component receiving the rotor speed estimate from the speed estimate controller and providing the bypass control signal to bypass the switching system when the rotor speed estimate is greater than a second threshold.

7. The motor drive system of claim 4, further comprising bypass switches operative to selectively bypass the switching system by connecting the motor leads to the AC power source according to a bypass control signal; and a bypass control component receiving the rotor speed estimate from the speed estimate controller and providing the bypass control signal to bypass the switching system when the rotor speed estimate is greater than a second threshold.

8. The motor drive system of claim 1:

wherein the motor startup control system computes one of a stator flux modulus and a rotor flux modulus;

wherein the speed estimate controller is a proportional integral (PI) controller with proportional and integral gains $K_I$ and $K_P$, respectively;

and wherein the speed estimate controller adjusts $K_I$ and $K_P$ according to a reciprocal of the square of the stator or rotor flux modulus.

9. The motor drive system of claim 8, further comprising bypass switches operative to selectively bypass the switching system by connecting the motor leads to the AC power source according to a bypass control signal; and a bypass control component receiving the rotor speed estimate from the speed estimate controller and providing the bypass control signal to bypass the switching system when the rotor speed estimate is greater than a second threshold.

10. The motor drive system of claim 1, wherein at least one gain value in the speed estimate controller is adjusted at least in part according to one of a stator flux modulus and a rotor flux modulus.

11. A startup control system for controlling the speed of an electric motor during startup, comprising:

a speed estimate controller providing a rotor speed estimate according to a controller error input;

a hybrid model reference adaptive system (MRAS) component, including a torque-based MRAS component providing a first error term representing a difference between a calculated torque value and an estimated torque value, and a rotor flux-based MRAS component providing a second error term representing a difference between a calculated rotor flux and an estimated rotor flux;

an error selector operatively coupled with the hybrid MRAS component and with the speed estimate controller to provide the error input to the speed estimate controller, the error selector providing the first error term as the controller error input when the rotor speed estimate is less than or equal to a first threshold and providing the second error term as the controller error input when the rotor speed estimate is greater than the first threshold; and a motor controller providing a controller output for controlling the motor speed during startup according to a desired startup speed profile and according to the rotor speed estimate.

12. The startup control system of claim 11, wherein the first threshold is about 80% of the rated full speed of the motor.

13. The startup control system of claim 11, wherein the startup control system evaluates stator equations to derive a calculated rotor flux according to current and voltage feedback values, and evaluates rotor equations to derive an estimated rotor flux according to current and voltage feedback values and according to the rotor speed estimate, wherein the torque-based MRAS component computes a calculated torque value according to the calculated rotor flux, computes an estimated torque value according to the estimated rotor flux, and provides the first error term as the difference between the calculated and estimated torque values, and wherein the rotor flux-based MRAS component provides the second error term as a vector product of the calculated rotor flux and the estimated rotor flux.

14. The startup control system of claim 11, wherein the motor startup control system computes one of a stator flux modulus and a rotor flux modulus, wherein the speed estimate controller is a proportional integral (PI) controller with proportional and integral gains $K_I$ and $K_P$, respectively, and wherein the speed estimate controller adjusts $K_I$ and $K_P$ according to a reciprocal of the square of either the stator flux modulus or the rotor flux modulus.

15. The startup control system of claim 11, wherein at least one gain value in the controller is adjusted according to a stator flux modulus or a rotor flux modulus.

16. A hybrid model reference adaptive system (MRAS) motor speed estimation system for estimating the speed of an electric motor, comprising:

a speed estimate controller providing a rotor speed estimate according to a controller error input, the controller including at least one gain factor that is adjusted at least in part according to a stator flux modulus or a rotor flux modulus;

a torque-based MRAS component providing a first error term representing a difference between a calculated torque value and an estimated torque value;

a rotor flux-based MRAS component providing a second error term representing a difference between a calculated rotor flux and an estimated rotor flux; and an error selector providing the error input to the speed estimate controller according to the first error term when the rotor speed estimate is in a first speed range and providing the error input according to the second error term when the rotor speed estimate is in a second speed range.

17. The motor speed estimation system of claim 16, wherein the torque-based MRAS component computes the calculated torque value and the estimated torque value, and provides the first error term as the difference between the calculated and estimated torque values, and wherein the rotor flux-based MRAS component provides the second error term as a vector product of the calculated rotor flux and the estimated rotor flux.

18. The motor speed estimation system of claim 16, wherein the speed estimate controller is a proportional integral (PI) controller with proportional and integral gains $K_I$ and $K_P$, respectively, and wherein the speed estimate controller adjusts $K_I$ and $K_P$ according to either the stator flux modulus or the rotor flux modulus.

19. A method of controlling the speed of an electric motor, the method comprising:
  providing a rotor speed estimate according to a controller error input;
  providing a controller output according to the rotor speed estimate and according to a desired speed profile;
  controlling the motor speed according to the controller output;
  computing a first error term as the difference between a calculated torque value and an estimated torque value;
  computing a second error term as a vector product of a calculated rotor flux and an estimated rotor flux; and
  providing the controller error input according to the first error term when the rotor speed estimate is in a first speed range and providing the error input according to the second error term when the rotor speed estimate is in a second speed range.

20. The method of claim 19, further comprising adjusting at least one gain factor of the controller at least in part according to a stator flux modulus or a rotor flux modulus.

* * * * *